United States Patent
Hyashi et al.

[11] 3,878,239
[45] Apr. 15, 1975

[54] PROSTAGLANDIN D COMPOUNDS PRODUCTION

[75] Inventors: Masaki Hayashi; Tadao Tanouchi, both of Osaka, Japan

[73] Assignee: Ono Pharmaceutical Co., Ltd., Osaka, Japan

[22] Filed: May 1, 1973

[21] Appl. No.: 356,248

[30] Foreign Application Priority Data
May 9, 1972   Japan.............................. 47-45794

[52] U.S. Cl...... 260/514 D; 260/240 R; 260/317 B; 260/468 D; 474/305; 474/317
[51] Int. Cl............................................ C07c 01/36
[58] Field of Search..................... 260/468 D, 514 D

[56] References Cited
OTHER PUBLICATIONS
Nygteren et al., Recv. Trav. Pay Bus 85, 405 (1966).
Granstrom et al., TBC 243, 4104 (1968).
House, Modern Synthetic Reactions, 2nd Ed., pp. 261–262 (1973).

Primary Examiner—Robert Gerstl
Attorney, Agent, or Firm—Albert H. Graddis; Frank S. Chow

[57] ABSTRACT

This invention relates to prostaglandin D compounds of the general formula:

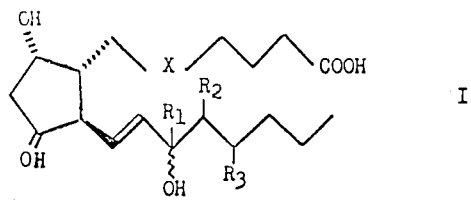

wherein X is $-CH_2CH_2-$ or cis$-CH=CH-$; wherein one or two of $R_1$, $R_2$ and $R_3$ are methyl and the remainders are hydrogen, or all of $R_1$, $R_2$ and $R_3$ are hydrogen, and ∼ indicates attachment of hydroxyl to C-15 in alpha and/or beta configuration. These compounds are useful as hypotensive agents and smooth muscle stimulants.

4 Claims, No Drawings

PROSTAGLANDIN D COMPOUNDS PRODUCTION

This invention relates to prostaglandin D compounds of the general formula:

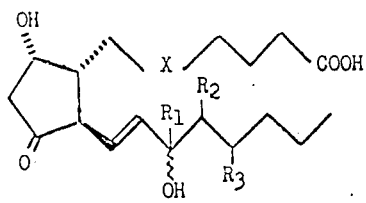

I wherein X is $-CH_2CH_2-$ or cis$-CH=CH-$; wherein one or two of $R_1$, $R_2$ and $R_3$ are methyl and the remainders are hydrogen, or all of $R_1$, $R_2$ and $R_3$ are hydrogen, and $\sim$ indicates attachment of hydroxyl to C-15 in alpha and/or beta configuration. These compounds are useful as hypotensive agents and smooth muscle stimulants.

The prostaglandin D compounds of this invention include the natural optical isomers, the enantimorphs, and the racemates thereof. These are within the scope of the present invention.

This invention also relates to the process for producing the prostaglandin D compounds represented by the aforementioned formula.

According to a feature of the present invention, the compounds of general formula I are prepared by the following procedures.

Compounds of the general formula:

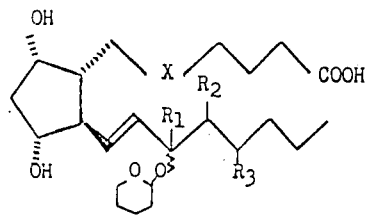

II wherein X, $R_1$, $R_2$ and $R_3$ are as hereinbefore defined, are oxidized to obtain compounds of the general formula:

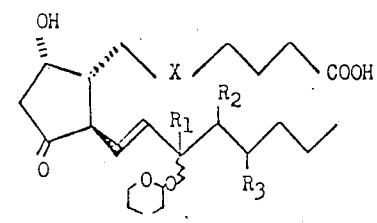

III wherein X, $R_1$, $R_2$ and $R_3$ are as hereinbefore defined.

The compounds of general formula I are prepared thereafter by the hydrolysis of compounds of the general formula III.

Prostaglandins, which are obtained in very small quantities from various tissues of animal and secreted in the living body, have been known to possess valuable pharmacological properties. A few of those pharmacological properties are stimulation of smooth muscle; hypotension; antilipolytic activity and the like.

Some of the known prostaglandins are classified into three groups depending on the chemical structure of the five-membered ring, i.e., prostaglandin E compounds when it is

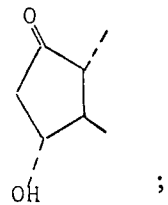

;

prostaglandin F compounds when it is

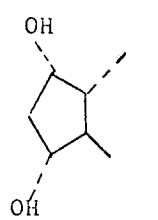

;

and prostaglandin A compounds when it is

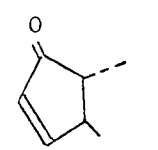

In the course of biosynthesis of $PGE_1$ and $PGE_{1\alpha}$ with the homogenate of a sheep seminal vesicle using 8,11,14-eicosatrienoic acid as the substrate, a very small amount of the compound of formula IV has been formed as a by-product. See, for example, B. Samuelsson et al., Journal of Biological Chemistry, 243, 4104 (1968).

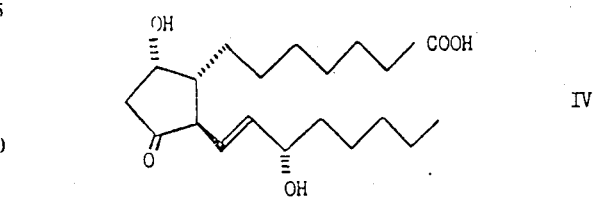

IV

See also Offenlegungsschrift 1927802.

Referring now to formula IV and PGE, the oxo and hydroxyl group of PGD are located in an opposite position to those of prostaglandin E compounds (9-hydroxy-11-oxo-prostanoic acids). The compounds of this invention are generically classified as prostaglandin D compounds.

We have found, surprisingly, that when compound II was oxidized, the hydroxyl group at C-11 of compound II is selectively oxidized to form compound III. The present invention stems from this surprising discovery.

As the result of oxidation, prostaglandin E of the chemical structure represented by the formula V was formed as a minor product. However, the quantitative ratio of compound III and compound V was 2~3 : 1.

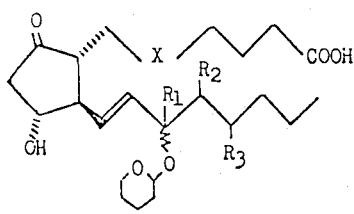

It is postulated that the selective oxidation is due to the influence by the configuration of the substituents at C-9 and C-11. It was revealed that the compound (dioxo-compound) wherein the hydroxyl both at C-9 and C-11 are oxidized, cannot be formed by the oxidation under mild conditions.

The starting materials for the present invention (formula II compounds) are novel compounds, and are prepared by the following reaction sequence.

The starting material for the preparation of compounds II are 2-oxa-3-oxo-6 syn-[3'α-hydroxy-1'trans-octenyl]-7 anti-acetoxy-cis-bicyclo[3, 3, 0]-octane (VI, $R_1=R_2=R_3=H$), which is a known substance [See, for example, J. Am. Chem. Soc., 92,397 (1970), and 91, 5675 (1969)] and 2-oxa-3-oxo-6 syn-[3'-hydroxy-3'-methyl-1'trans-octenyl]-7 anti-acetoxy-cis-bicyclo[3, 3, 0]-octane, 2-oxa-3-oxo-6 syn-[3'α-hydroxy-4'(R)-methyl-1'trans-octenyl]-7 anti-acetoxy-cis-bicyclo[3, 3, 0]-octane, 2-oxa-3-oxo -6 syn-[3'α-hydroxy-4'(S)-methyl-1'trans-octenyl]-7 anti-acetoxy-cis-bicyclo[3, 3, 0]-octane, 2-oxa-3-oxo-6 syn-[3'α-hydroxy-5'-methyl-1'trans-octenyl]-7 anti-acetoxy-cis-bicyclo[3, 3, 0]-octane, and 2-oxa-3-oxo-6 syn-[3' -hydroxy-3',4'-dimethyl-1'trans-octenyl]-7 anti-acetoxy-cis-bicyclo[3, 3, 0]-octane, which are described in our copending U.S. application Ser. No. 247,803, filed Apr. 26, 1972.

The synthesis of compound II from compound VI is carried out by the sequence of the transformation as shown in Chart A.

More particularly compound VII is prepared by the reaction of compound VI with dihydropyran in methylene chloride using p-toluene sulfonic acid as the condensing agent. Next, compound VII is reduced with diisobutyl aluminum hydride in toluene for about 15 minutes at about −60°C to obtain compound VIII. Dimsyl anion, previously prepared with sodium hydride and dimethyl sulfoxide, is made to react with 4-carboxy-n-butyl-triphenyl phosphonium bromide to form 4-carboxy-n-butylidene triphenyl phosphorane (IX). Compound VIII is added to IX, and the mixture is made to react to dimethyl sulfoxide for 2 hours at room temperature. Compound IIa is converted into compound IIb by catalytic hydrogenation, e.g., with palladium in methanol.

The oxidation of compound II to compound III is carried out by the following reaction sequence.

As compound III is quite unstable to acid, alkali or heat, the oxidation thereof is effected under selective conditions. The preferred oxidizing agent is chromic acid. Especially preferred methods are the two-phase oxidation (See Fieser and Fieser "Reagents for Organic Synthesis," page 143 (1968) Wiley, New York), or the method for Jones reagent. The reaction should take place at a low temperature, e.g. 10°C to −50°C. After extraction procedures, the crude product is purified by column chromatography. Although the separation of compounds III and V can be achieved by column

CHART A

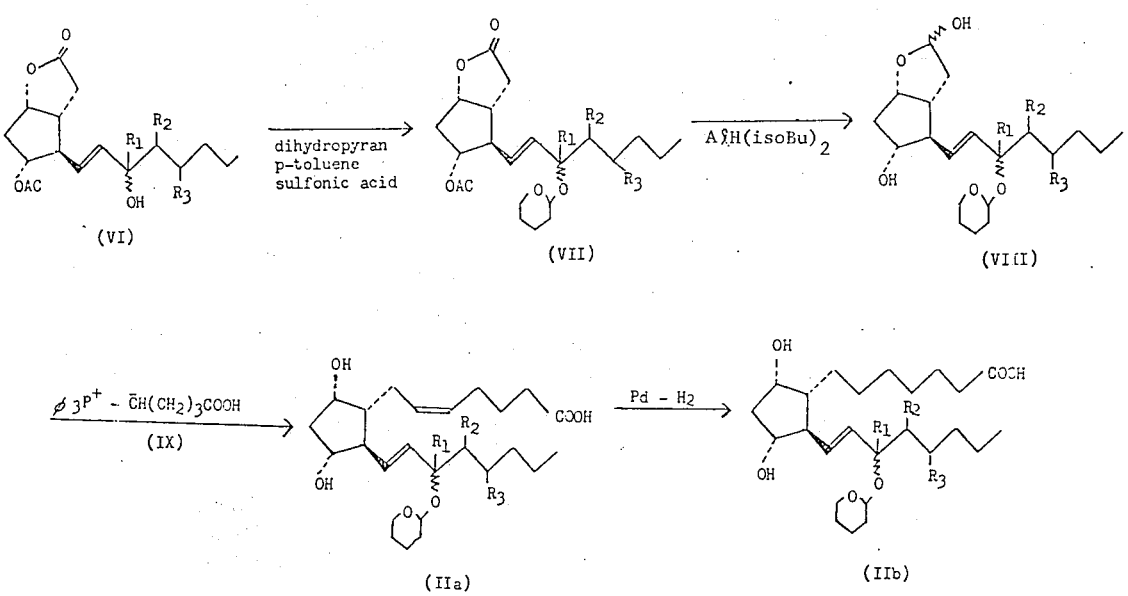

shromatography, it is simpler to separate compound I and $PGE_1$, $E_2$ or similar compounds after the hydrolysis. Therefore, at this stage, it is not necessary to separate compounds III and V.

The subsequent hydrolysis is carried out with aqueous solution of organic acid, e.g., acetic acid, or with dilute solution of mineral acid, e.g., hydrochloric acid. Since compound III is very sparingly soluble in water, the hydrolysis should preferably take place in the presence of a solvent miscible with water, e.g., alcohol or tetrahydrofuran. Inasmuch as compounds I and III are unstable to acid and heat, the reaction is preferably effected at a low temperature, typically less than 45°C. The pure compound of formula I is readily obtained after extraction and purification by column chromatography of the mixture of reaction products.

The Rf value on thin-layer chromatography and the infra-red spectrum of the formula I compound ($X=-CH_2CH_2-$, $R_1=R_2=R_3=H$) prepared by the above methods agree with those of $9\alpha,15\alpha$-dihydroxy-11-oxo-13 trans-prostenoic acid, as in the Samuelson publication. More particularly, the structure of said compound I is determined and confirmed by:

a. greater Rf value than that of $PGE_1$ on thin-layer chromatography,
b. same peaks as $PGE_1$ in infra-red spectrum,
c. same peaks as $PGE_1$ in mass spectrum, but slightly different peaks of olefinic proton region in the nuclear magnetic resonance spectrum,
d. maximum absorption at 235 $\mu$ with alkalitreatment, but $PGE_1$ shows at 278 $\mu$, and
e. $PGF_{1\alpha}$ is formed by the reduction with sodium borohydride.

All the compounds of this invention of generic formula I and their derivatives are determined by these physical measurements.

The melting point, infra-red spectrum, nuclear magnetic resonance spectrum, Rf value on thin-layer chromatography and biological activities of $PGE_1$ formed as a by-product in the course of the preparation for the compound I ($X=-CH_2CH_2-$, $R_1=R_2=R_3=H$) completely agree with those of natural $PGE_1$.

Prostaglandin D compound prepared by the sequence of the aforementioned procedures can be further converted, by known methods, to various analogous compounds each of them having specific properties.

When it is treated, for example, with an equivalent of alkali or organic amine, a metallic salt or organic amine salt of prostaglandin D compound, which is easily soluble in water, is formed.

It can be stabilized if it is treated with certain molecules, e.g., cyclodextrin, to form the clathrate compound utilizing the procedure described in U.S. patent application Ser. No. 147,255, filed May 26, 1971.

An ester form of prostaglandin D compounds is formed by one of (i) esterification with diazoalkanes, (ii) reaction with alcohol or thiol in the presence of dicyclohexyl carbodiimide as a condensing agent, or (iii) reaction with alcohols following the formation of a mixed acid anhydride by adding tertiary amine and pivaloyl halide or alkyl sulfonyl halide (our Belgium Patents, Nos. 775106 and 776294).

An alcohol form of prostaglandin D compounds is formed by converting methyl ester to oxime, reducing with lithium aluminum hydride to form oxime alcohol, and hydrolyzing it.

Furthermore, if two double bonds of prostaglandin $D_2$ compounds are reduced with Pd or Pt, a dihydro form of prostaglandin $D_1$ compounds are formed.

The compounds of general formula I possess the valuable pharmacological properties typical of prostaglandins including, in particular, the production of hypotension, stimulation of intestinal contraction, inhibition of blood platelet aggregation and bronchodilation, and are useful in the prevention and treatment of hypertension, the treatment of disorders of peripheral circulation, the treatment of intestinal dyskinesia and post-operative intestinal paralysis, the prevention and treatment of constipation, cerbral thrombosis and myocardial infarction, and the treatment of asthma. For example, in laboratory screening tests, the compound of general formula I wherein X represents cis-vinylene and $R_1$, $R_2$ and $R_3$ are each hydrogen produces:

a. A 26 mm. Hg fall for 6 minutes in the blood pressure of the allobarbital-anaesthetized dog at a dose of 10 $\mu$g/kg animal body weight;
b. a stimulatory effect on the contraction of the isolated ascending colon of the guinea pig, producing 50 percent contraction at a concentration of $1.4 \times 10^{-7}$ g/ml;
c. inhibitions of adenosine diphosphate-indused blood platelet aggregation in platelet-rich plasma of rabbits of 67.4 percent at a dose of 10 $\mu$g/ml, 44.4 percent at a dose of 1 $\mu$g/ml and 20.8 percent at a dose of 0.1 $\mu$g/ml in comparison with controls, and
d. in vivo bronchodilator activity by aerosol administration against convulsions in the guinea pig induced by the inhalation of histamine-containing aerosol, the ratio of the pre-convulsion time after inhalation of an aerosol generated from a solution containing 10 $\mu$g/ml of the said compound of general formula I to the pre-convulsion time in animals not receiving the compound being 1.52:1 [use of the same concentration of isoprenaline (isoproterenol) gave a corresponding ratio of 1.49:1, which indicates that the compound of formula I is equipotent to isoprenaline in bronchodilator activity].

The $LD_{50}$ dose of the aforesaid compound when administered sub-cutaneously to mice was 40 mg/kg animal body weight. In the management of hypertensive states in mammals such as cats and dogs, the recommended dose is 0.1 mg/kg to 10 mg/kg 2 to 3 times daily, orally or by intramuscular injection. This dosage regimen can be varied depending upon the species of mammal being treated and the severity of the condition, by methods well known to the healing arts.

In order to further illustrate the practice of this invention, the following examples are included:

REFERENCE EXAMPLE 1

2-oxa-3-oxo-6 syn-[3'$\alpha$-(2''-tetrahydropyranyloxy-1'trans-octenyl]-7 anti-acetoxy-cisbicyclo[3, 3, 0]-octane 25.0 g of 2-oxa-3-oxo-6 syn-[3'$\alpha$-hydroxy-1'trans-octenyl]-7 anti-acetoxy-cisbicyclo[3, 3, 0]-octane was dissolved in 250 ml of methylene chloride. Whilst stirring at about 20°–25°C, 10.2 g of dihydropyran and catalytic amount of p-toluene sulfonic acid were added. After subsequent 20-minutes-stirring at the same temperature, the solution was diluted with 1.2 l of ethyl acetate, washed with saturated sodium bicarbonate solution and saturated sodium chloride solution, dried over anhydrous magnesium sulfate, and freed of solvent in vacuo to yield 31.6 g of 2-oxa-3-oxo-6 syn-[3'α-(2''-tetrahydropyranyloxy-1'trans-octenyl]-7 anti-acetoxy-cisbicyclo[3, 3, 0]-octane (yield 100 percent) as a colorless oil, having the following physical characteristics:

Infra-red spectrum (liquid film): 2920, 2850, 1775, 1735, 1440, 1370, 1240, 1200, 1175, 1115, 1108, 1080, 1030, 980 cm$^{-1}$ Nuclear magnetic resonance spectrum (in CDCl$_3$): δ 5.6–5.3 (m), 5.2–4.8 (m), 4.7–4.3 (m), 4.2–3.2 (m), 2.8–2.5 (m), 2.0 (s), 1.58 (s), 0.82 (t)

Thin-layer chromatography (methylene chloride:methanol=20:1): R$f$=0.92

REFERENCE EXAMPLE 2

2-oxa-3-oxo-6 syn-[3'-(2''-tetrahydropyranyloxy)-3'-methyl-1'trans-octenyl]-7 anti-acetoxy-cisbicyclo [3, 3, 0]-octane 21.25 g of 2-oxa-3-oxo-6 syn-[3'-hydroxy-3'-methyl-1'trans-octenyl]-7 anti-acetoxy-cisbicyclo[3, 3, 0]-octane was dissolved in 200 ml of methylene chloride. Whilst stirring at about 20°–25°C, 8.7 g of dihydropyran and a catalytic amount of p-toluene sulfonic acid were added to make them react for 20 minutes. After the reaction, the solution was post-treated with the same manner as in the Reference Example 1 to yield 26.2 g of 2-oxa-3-oxo-6 syn-[3'-(2''-tetrahydropyranyloxy)-3'-methyl-1'trans-octenyl]-7 anti-acetoxy-cisbicyclo[3, 3, 0]-octane (yield 98 percent) as a pale yellow oil, having the following physical characteristics:

Infra-red spectrum (liquid film): 2930, 2850, 1780, 1740, 1440, 1370, 1240, 1200, 1175, 1115, 1100, 1080, 1030, 980 cm$^{-1}$ Nuclear magnetic resonance spectrum (in CDCl$_3$): δ 5.6–5.25 (m), 5.20–4.75 (M), 4.75–4.30 (m), 4.24–3.20 (m), 2.02 (s)

Thin-layer chromatography (methylene chloride:methanol=20:1):

Rf=0.90

REFERENCE EXAMPLE 3

2-oxa-3-oxo-6 syn-[3'α-(2''-tetrahydropyranyloxy)-4'(R)-methyl-1'trans-octenyl]-7 anti-acetoxy-cisbicyclo[3, 3, 0]-octane 18.2 g of 2-oxa-3-oxo-6 syn-[3'α-hydroxy-4'(R)-methyl-1'trans-octenyl]-7 anti-acetoxy-cisbicyclo[3, 3, 0]-octane was dissolved in 180 ml of methylene chloride. Whilst stirring at about 20°–25°C, 7.5 g of dihydropyran and a catalytic amount of p-toluene sulfonic acid were added to make them react for 20 minutes. After the reaction, the solution was post-treated with the same manner as in the Reference Example 1 to yield 22.9 g of 2-oxa-3-oxo-6 syn-[3'α-(2''-tetrahydropyranyloxy)-4'(R)-methyl-1'trans-octenyl]-7 anti-acetoxy-cisbicyclo[3, 3, 0]-octane (yield 100 percent) as a colorless oil, having the following physical characteristics:

Infra-red spectrum (liquid film): 2930, 2850, 1775, 1740, 1465, - 1440, 1375, 1240, 1200, 1170, 1075, 1020, 975 cm$^{-1}$ Nuclear magnetic resonance spectrum (in CDCl$_3$): δ 5.65–5.27 (m), 5.16–4.73 (m), 4.73–4.30 (m), 4.20–3.20 (m), 1.98 (s)

Thin-layer chromatography (methylene chloride:methanol=20:1):

Rf=0.93

REFERENCE EXAMPLE 4

2-oxa-3-oxo-6 syn-[3'α-(2''-tetrahydropyranyloxy)-4'(S)-methyl-1'trans-octenyl]-7 anti-acetoxy-cisbicyclo[3, 3, 0]-octane 26.4 g of 2-oxa-3-oxo-6 syn-[3'α-hydroxy-4'(S)-methyl-1'trans-octenyl]-7 anti-acetoxy-cisbicyclo3, 3, 0]-octane was dissolved in 260 ml of methylene chloride. Whilst stirring at about 20°–25°C, 10.9 g of dihydropyran and a catalytic amount of p-toluene sulfonic acid were added to make them react for 20 minutes. After the reaction, the solution was post-treated with the same manner as in the Reference Example 1 to yield 31.9 g of 2-oxa-3-oxo-6 syn-[3'α-(2''-tetrahydropyranyloxy)-4'(S)-methyl-1'trans-octenyl]-7 anti-acetoxy-cisbicyclo[3, 3, 0]-octane (yield 96 percent) as a colorless oil, having the following physical characteristics:

Infra-red spectrum (liquid film): 2930, 2850, 1775, 1735, 1440, 1370, 1320, 1240, 1200, 1170, 1130, 1075, 1020, 975 cm$^{-1}$ Nuclear magnetic resonance spectrum (in CDCl$_3$): δ 5.63–5.28 (m), 5.23–4.75 (m), 4.70–4.32 (m), 4.26–3.20 (m), 2.02 (s)

Thin-layer chromatography (methylene chloride:methanol=20:1):

Rf = 0.94

REFERENCE EXAMPLE 5

2-oxa-3-oxo-6 syn-[3'α-(2''-tetrahydropyranyloxy)-5'-methyl-1'trans-octenyl]-7 anti-acetoxy-cisbicyclo [3, 3, 0]-octane 33.0 g of 2-oxa-3-oxo-6 syn-[3'α-hydroxy-5'-methyl-1'trans-octenyl]-7 anti-acetoxy-cisbicyclo[3, 3, 0]-octane was dissolved in 330 ml of methylene chloride. Whilst stirring at about 20°–25°C, 13.5 g of dihydropyran and a catalytic amount of p-toluene sulfonic acid were added to make react them for 20 minutes. After the reaction, the solution was post-treated with the same manner as in the Reference Example 1 to yield 41.2 g of 2-oxa-3-oxo-6 syn-[3'α-(2''-tetrahydropyanyloxy)-5'-methyl-1'trans-octenyl]-7 anti-acetoxy-cisbicyclo[3, 3, 0]-octane (yield 99 percent) as a colorless oil, having the following physical characteristics:

Infra-red spectrum (liquid film): 2930, 2850, 1780, 1740, 1435, 1370, 1320, 1240, 1170, 1080, 1030, 975 cm$^{-1}$ Nuclear magnetic resosnsce spectrum (in CDCl$_3$): δ 5.65–5.24 (m), 5.20–4.73 (m), 4.73–4.30 (m), 4.24–3.20 (m), 2.03 (s)

Thin-layer chromatography (methylene chloride:methanol=20:1):

Rf=0.92

REFERENCE EXAMPLE 6

2-oxa-3-hydroxy-6 syn-[3'α-(2''-tetrahydropyranyoxy)-1'trans-octenyl]-7 anti-hydroxy-cisbicyclo[3, 3, 0]-octane 31.5 g of 2-oxa-3-oxo-6 syn-[3'α-(2''- tetrahydropyranyloxy)-1'trans-octenyl]-7 anti-acetoxy-cisbicyclo[3, 3, 0]-octane was dissolved in 630 ml of toluene. Whilst stirring and cooling to −60°C in an atmosphere of nitrogen, 230 ml of toluene solution of diisobutylaluminium hydride (concentration : 0.25 g/ml) was added dropwise during about 10 minutes, and stirred for subsequent 15 minutes at the same temperature. Methanol 10 ml was then added, and warmed up to 0°C. Water 30 ml was then added, and was stirred for one hour at room temperature. The precipitate was filtered off, and the filtrate was washed with saturated sodium chloride solution, dried over anhydrous magnesium sulfate, and freed of solvent in vacuo to yield 27.0 g of 2-oxa-3-hydroxy-6 syn-[3'α-(2''-tetrahydropyranyloxy)-1'trans-octenyl]-7 anti-hydroxy-cisbicyclo[3, 3, 0]-octane (yield 94.5 percent) as a colorless oil, having the following physical characteristics:

Infra-red spectrum (liquid film): 3600–3100, 2950–2850, 1460, 1450, 1440, 1380, 1355, 1322, 1292, 1260, 1200, 1180, 1105, 1078, 1020, 975, 905, 875, cm$^{-1}$ Thin-layer chromatography (methylene chloride:methanol=20:1):

Rf=0.23

REFERENCE EXAMPLE 7

2-oxa-3-hydroxy-6 syn-[3'-(2''-tetrahydropyranyloxy)-3'-methyl-1'trans-octenyl]-7 anti-hydroxy-cisbicyclo[3, 3, 0]-octane 26 g of 2-oxa-3-oxo-6 syn-[3'-(2''-tetrahydropyranyloxy)-3'-methyl-1'trans-octenyl]-7 anti-acetoxy-cisbicyclo[3, 3, 0]-octane was dissolved in 520 ml of toluene. Whilst stirring and cooling to −60°C in an atmosphere of nitrogen, 190 ml of toluene solution of diisobutylaluminium hydride (concentration : 0.25 g/ml) was added dropwise during about 10 minutes, and was stirred for subsequent 15 minutes. After the reaction, the solution was post-treated with the same manner as in the Reference Example 6 to yield 21.5 g of 2-oxa-3-hydroxy-6 syn-[3'-(2''-tetrahydropyranyloxy)-3'-methyl-1'trans-octenyl]-7 anti-hydroxy-cisbicyclo[3, 3, 0]-octane (yield 92 percent) as a pale yellow oil, having the following physical characteristics:

Infra-red spectrum (liquid film): 3380, 2930, 2850, 1460–1440, 1380, 1355, 1290, 1265, 1200, 1180, 1110, 1075, 1020, 980, 905 cm$^{-1}$ Thin-layer chromatography (methylene chloride:methanol=20:1):

Rf=0.25

REFERENCE EXAMPLE 8

2-oxa-3-hydroxy-6 syn-[3'α-(2''-tetrahydropyranyloxy)-4'(R)-methyl-1'trans-octenyl]-7 anti-hydroxy-cisbicyclo[3, 3, 0]-octane 22 g of 2-oxa-3-oxo-6 syn-[3'α-(2''-tetrahydropyranyloxy)-4'(R)-methyl-1'trans-octenyl]-7 anti-acetoxy-cisbicyclo[3, 3, 0]-octane was dissolved in 440 ml of toluene. Whilst stirring and cooling to −60°C in an atmoshpere of nitrogen, 170 ml of toluene solution of diisobutylaluminium hydride (concentration:0.25 g/ml) was added dropwise during about 10 minutes, and was stirred for subsequent 15 minutes. After the reaction, the solution was post-treated with the same manner as in the Reference Example 6 to yield 18.8 g of 2-oxa-3-hydroxy-6 syn-[3'α-(2''-tetrahydropyranyloxy)-4'(R)-methyl-1'trans-octenyl]-7 anti-hydroxy-cisbicyclo[3, 3, 0]-octane (yield 95 percent) as a colorless oil, having the following physical characteristics:

Infra-red spectrum (liquid film): 3400, 2930, 2850, 1460–1440, 1380, 1360, 1290, 1260, 1200, 1180, 1105, 1075, 1025, 980, 905 cm$^{-1}$ Thin-layer chromatography (methylene chloride:methanol=20:1):

Rf=0.23

REFERENCE EXAMPLE 9

2-oxa-3-hydroxy-6 syn-[3'α-(2''-tetrahydropyranyloxy)-4'(S)-methyl-1'trans-octenyl]-7 anti-hydroxy-cisbicyclo [3, 3, 0]-octane 31 g of 2-oxa-3-oxo-6 syn-[3'α-(2''-tetrahydropyranyloxy)-4'(S)-methyl-1'trans-octenyl]-7 anti-acetoxy-cisbicyclo[3, 3, 0]-octane was dissolved in 620 ml of toluene. Whilst stirring and cooling to −60°C in an atmosphere of nitrogen, 230 ml of toluene solution of diisobutylaluminium hydride (concentration:0.25 g/ml) was added dropwise during 10 minutes, and was stirred for subsequent 15 minutes. After the reaction, the solution was post-treated with the same manner as in the Reference Example 6 to yield 25.4 g of 2-oxa-3-hydroxy-6 syn-[3'α-(2''-tetrahydropyranyloxy)-4'(S)-methyl-1'trans-octenyl]-7 anti-hydroxy-cisbicyclo[3, 3, 0]-octane (yield 91 percent) as a colorless oil, having the following physical characteristics:

Infra-red spectrum (liquid film): 3360, 2930, 2850, 1460–1440, 1380, 1355, 1290, 1265, 1200, 1175, 1105, 1080, 1020, 905 cm$^{-1}$ Thin-layer chromatography (methylene chloride:methanol=20:1):

Rf=0.24

REFERENCE EXAMPLE 10

2-oxa-3-hydroxy-6 syn-[3'α-(2''-tetrahydropyranyloxy)-5'-methyl-1'trans-octenyl]-7 anti-hydroxy-cisbicyclo [3, 3, 0]-octane 41 g of 2-oxa-3-oxo-6 syn-[3'α-(2''-tetrahydropyranyloxy)-5'-methyl-1'trans-octenyl]-7 anti-acetoxy-cisbicyclo[3, 3, 0]-octane was dissolved in 820 ml of toluene. Whilst stirring and Rf=0.25 and cooling to −60°C in an atmosphere of nitrogen, 300 ml of toluene solution of diisobutylaluminium hydride (concentration:0.25 g/ml) was added dropwise during 10 minutes, and was stirred for subsequent 15 minutes. After the reaction, the solution was post-treated with the same manner as is the Reference Example 6 to yield 35.8 g of 2-oxa-3-hydroxy-6 syn-[3'α-(2''-tetrahydropyranyloxy)-5'-methyl-1'trans-octenyl]-7-anti-hydroxy-cisbicyclo-[3, 3, 0]-octane (yield 97 percent) as a colorless oil, having the following physical characteristics:

Infra-red spectrum (liquid film): 3400, 2940, 2850, 1460–1440, 1380, 1355, 1320, 1290, 1260, 1200, 1180, 1105, 1075, 1020, 975, 910 cm$^{-1}$ Thin-layer chromatography (methylene chloride:methanol=20:1):

Rf=0.25

REFERENCE EXAMPLE 11

9α,11α-dihydroxy-15-(2'-tetrahydropyranyloxy)-5 cis, 13 trans-prostadienoic acid To 300 ml of dimethyl sulfoxide solution of 4-carboxy-n-butyl-triphenyl-phosphonium bromide 168 g. demsyl anion, which has been obtained by heating 370 ml of dimethyl sulfoxide containing 32.6 g of sodium hydride at 70°C for one hour, was added dropwise at about 20°–25°C. Next, 100 ml of dimethyl sulfoxide solution of 2-oxa-3-hydroxy-6 syn-[3'α-(2''-tetrahydropyranyloxy)-1'trans-octenyl]-7 anti-hydroxy-cisbicyclo[3, 3, 0]-octane 27 g was added, and was stirred for two hours. The reaction mixture was placed into 4 l of ice water, and was extracted with ethyl acetate to eliminate by-products. The water layer was then acidified with saturated oxalic acid solution, and was extracted with the mixture of ether and pentane (1:1). After washed with water and saturated sodium chloride solution, the extract was dried over anhydrous magnesium sulfate, and freed of solvent in vacuo. The residue (26 g) was purified by the column chromatography on silica gel using the mixture of ethyl acetate and cyclohexane (3:2) as an eluant to yield 22 g of pure 9α,11α-dihydroxy-11α-(2'-tetrahydropyranyloxy)-5 cis,13 trans-prostadienoic acid (yield 66 percent) as a colorless oil, having the following physical characteristics:

Infra-red spectrum (liquid film): 3600–2400, 1710, 1460, 1440, 1380, 1250, 1200 1195, 1120, 1110, 1080, 1060, 1040, 1020, 995 cm$^{-1}$ Nuclear magnetic resonance spectrum (in CDCl$_3$): δ 6.5–6.1(br.s), 5.6–5.2(m), 4.9–4.5(m), 4.4–3.2 (m), 2.5–1.9 (m), 1.8–1.4 (m), 1.4–1.1 (m), 0.86 (t)

Thin-layer chromatography (methylene chloride:methanol=20:1):

Rf=0.21

REFERENCE EXAMPLE 12

9α,11α-dihydroxy-15-(2'-tetrahydropyranyloxy)-15-methyl-5 cis,13 trans-prostadienoic acid To 250 ml of dimethyl sulfoxide solution of 4-carboxy-n-butyl-triphenyl-phosphonium bromide 140 g, demsyl anion, which has been obtained by heating 310 ml of dimethyl sulfoxide containing 27.0 g of sodium hydride at 70°C for one hour, was added dropwise at about 20°–25°C. Next, 85 ml of dimethyl sulfoxide solution of 2-oxa-3-hydroxy-6 syn-[3'-(2'-tetrahydropyranyloxy)-3-methyl-1'trans-octenyl]-7 anti-hydroxy-cisbicyclo-[3, 3, 0]-octane 23.3 g was added, and was stirred at 25°C for two hours. After the reaction, the solution was post-treated with the same manner as in the Reference Example 11 to yield 16.6 g of pure 9α,11α-dihydroxy-15-(2'-tetrahydrpyranyloxy)-15-methyl-5 cis,13 trans-prostadienoic aicd (yield 58 percent) as a pole yellow oil, having the following physical characteristics:

Infra-red spectrum (liquid film): 3400, 2930–2850,–2350, 1710, 1455, 1440, 1380, 1245, 1200, 1185, 1120, 1080, 1025, 990 cm$^{-1}$ Nuclear magnetic resonance spectrum ( in CDCl$_3$ ): δ 5.67–5.20 (m), 5.15–4.83 (broad s), 4.83–4.60 (m), 4.30–3.50 (m), 1.03–0.73 (t)

Thin-layer chromatography (methylene chloride:methanol=20:1):

Rf=0.23

REFERENCE EXAMPLE 13

9α,11α-dihydroxy-15α-(2'-tetrahydropyranyloxy)-16(R)-methyl-5 cis,13 trans-prostadienoic acid To 210 ml of dimethyl sulfoxide solution of 4-carboxy-n-butyl-triphenyl-phosphonium bromide 119 g, demsyl anion, which has been obtained by heating 260 ml of dimethyl sulfoxide containing 23.0 g of sodium hydride at 70°C for one hour, was added dropwise at about 20°–25°C. Next, 75 ml of dimethyl sulfoxide solution of 2-oxa-3-hydroxy-6 syn-[3'α-(2'-tetrahydropyranyloxy)-4'(R)-methyl-1'trans-octenyl]-7 anti-hydroxy-cisbicyclo-[3, 3, 0]-octane 20.0 g was added, and was stirred at 25°C for two hours. After the reaction, the solution was post-treated with the same manner as in the Reference Example 11 to yield 15.5 g of pure 9α,11α-dihydroxy-15α-(2'-tetrahydropyranyloxy)-16(R)-methyl-5 cis,13 trans-prostadienoic acid (yield 63 percent) as a colorless oil, having the following physical characteristics:

Infra-red spectrum (liquid film): 3350, 2930–2850,–2300, 1710, 1460, 1440, 1380, 1245, 1200, 1180, 1120, 1080, 1025, 985 cm$^{-1}$ Nuclear magnetic resonance spectrum (in CDCl$_3$): δ 5.70–5.20 (m), 5.20–4.90 (broad s), 4.78–4.55 (m), 4.32–3.20 (m), 1.06–0.70 (m)

Thin-layer chromatography (methylene chloride:methanol=20:1):

Rf=0.23

REFERENCE EXAMPLE 14

9α,11α-dihydroxy-15α-(2'-tetrahydropyranyloxy)-16(S)-methyl-5 cis,13 trans-prostadienoic acid To 270 ml of dimethyl sulfoxide solution of 4-carboxy-n-butyl-triphenyl phosphonium bromide 151 g, demsyl anion, which has been obtained by heating 330 ml of dimethyl sulfoxide containing 29.2 g of sodium hydride at 70°C for one hour, was added dropwise at about 20°–25°C. Next, 95 ml of dimethyl sulfoxide solution of 2-oxa-3-hydroxy-6 syn-[3'α-(2'-tetrahydropyranyloxy)-4'(S)-methyl-1'trans-octenyl]-7 anti-hydroxy-cisbicyclo-[3, 3, 0]-octane 25.4 g was added, and was stirred at 25°C for two hours. After the reaction, the solution was post-treated with the same manner as in the Reference Example 11 to yield 20.6 g of pure 9α, 11α-dihydroxy-15α-(2'-tetrahydropyranyloxy)-16(S)-methyl-5 cis,13 trans-prostadienoic acid (yield 66 percent) as a colorless oil, having the following physical characteristics:

Infra-red spectrum (liquid film): 3350, 2930–2850,–2300, 1710, 1460, 1440, 1380, 1245, 1200, 1175, 1120, 1080, 1025, 985 cm$^{-1}$ Nuclear magnetic resonance spectrum (in CDCl$_3$): δ 5.70–5.20 (m), 5.05–4.72 (broad s), 4.72–4.58 (m), 4.32–3.20 (m), 1.03–0.72 (m)

Thin-layer chromatography (methylene chloride:methanol=20:1):

REFERENCE EXAMPLE 15

9α,11α-dihydroxy-15α-(2'-tetrahydropyranyloxy)-17-methyl-5 cis,13 pl trans-prostadienoic acid To 115 ml of dimethyl sulfoxide solution of 4-carboxy-n-butyl-triphenyl phosphonium bromide 88.2 g, demsyl anion, which has been obtained by heating 200 ml of dimethyl sulfoxide containing 17.0 g of sodium hydride at 70°C for one hour, was added dropwise at about 20°–25°C. Next, 55 ml of dimethyl sulfoxide solution of 2-oxa-3-hydroxy-6 syn-[3'α-(2'-tetrahydropyranyloxy)-5'-methyl-1'trans-octenyl]-7 anti-hydroxy-cisbicyclo-[3, 3, 0]-octane 14.7 g was added, and was stirred at 25°C for two hours. After the reaction, the solution was post-treated with the same manner as in the Reference Example 11 to yield 11.2 g of pure 9α,11α-dihydroxy-15α-(2'-tetrahydropyranyloxy)-17-methyl-5 cis,13 trans-prostadienoic acid (yield 62 percent) as a colorless oil, having the following physical characteristics:

Infra-red spectrum (liquid film): 3380, 2930–2850,–2300, 1705, 1455, 1440, 1380, 1250, 1200, 1180, 1115, 1080, 1025, 985 cm$^{-1}$ Nuclear magnetic resonance spectrum (in CDCl$_3$): δ 5.70–5.05 (m,broad s), 4.82–4.60 (m), 4.27–3.21 (m), 1.04–0.75 (m)

Thin-layer chromatography (methylene chloride:methanol=20:1):

Rf=0.24

REFERENCE EXAMPLE 16

9α,11α-dihydroxy-15α-(2'-tetrahydropyranyloxy)-13 trans-prostenoic acid 2.0 g of 9α,11α-dihydroxy-15α-(2'-tetrahydropyranyloxy)-5 cis,13 trans-prostadienoic acid was dissolved in 60 ml of methanol. 250 mg of palladium-carbon was then added, and stirred for 30 minutes at room temperature in an atmosphere of hydrogen at a pressure of 1 atm. The catalyst was filtered off, and the filtrate was freed of solvent in vacuo to yield 2.0 g of 9α,11α-dihydroxy-15α-(2'-tetrahydropyranyloxy)-13 trans-prostenoic acid (yield 99.5 percent) as a colorless oil, having the following physical characteristics:

Infra-red spectrum (liquid film): 3600–2400, 1710, 1460, 1440, 1380, 1250, 1200, 1195, 1120, 1110, 1080, 1055, 1040, 1020, 990 cm$^{-1}$ Nuclear magnetic resonance spectrum (in CDCl$_3$): δ 6.5–6.1 (s), 5.5–5.3 (m), 4.9–4.5 (s), 4.4–3.2 (m), 2.5–1.9 (m), 1.8–1.4 (m), 1.4–1.1 (m), 0.86 (t)

Thin-layer chromatography (chloroform:tetrahydrofuran:acetic acid=10:2:1):

Rf=0.43

REFERENCE EXAMPLE 17

9α,11α-dihydroxy-15-(2'-tetrahydropyranyloxy)-15-methyl-13 trans-prostenoic acid 8.0 g of 9α,11α-dihydroxy-15-(2'-tetrahydropyranyloxy)-15-methyl-5 cis, 13 trans-prostadienoic acid was dissolved in 100 ml of methanol, and was added to the solution which has been prepared by adding 1 g of 5 percent-palladium-carbon to 150 ml of methanol. The catalytic reduction was taken place, at room temperature in an atmosphere of hydrogen at a pressure of 1 atm, until the absorption of a theoretical amount of hydrogen. The catalyst was filtered off, and the filtrate was concentrated in vacuo to yield 7.94 g of 9α,11α-dihydroxy-15-(2'-tetrahydropyranyloxy)-15-methyl-13 trans-prostenoic acid (yield 98 percent) as a pale yellow oil, having the following physical characteristics:

Infra-red spectrum (liquid film): 3400, 2930–2850,–2300, 1710, 1455, 1440, 1380, 1250, 1205, 1180, 1120, 1080, 1025, 980 cm$^{-1}$ Nuclear magnetic resonance spectrum (in CDCl$_3$): 5.6–5.3 (m),5.3–4.8 (br.s),4.8–4.5 (m), 4.4–3.2 (m),1.0–0.7 (t)

Thin-layer chromatography (chloroform:tetrahydrofuran:acetic acid=10:2:1):

Rf=0.44

REFERENCE EXAMPLE 18

9α,11α-dihydroxy-15α-(2'-tetrahydropyranyloxy)-16(R)-methyl-13 trans-prostenoic acid 7.5 g of 9α,11α-dihydroxy-15α-(2'-tetrahydropyranyloxy)-16(R)-methyl-5 cis,13 trans-prostadienoic acid was dissolved in 100 ml of methanol, and was added to the solution which has been prepared by suspending 920 mg of 5 percent-palladium-carbon in 150 ml of methanol and by replacing with hydrogen. The catalytic reduction was taken place, at room temperature in an atmosphere of hydrogen at a pressure of 1 atm, until the absorption of a theoretical amount of hydrogen. The catalyst was filtered off, and the filtrate was concentrated in vacuo to yield 7.28 g of 9α,11α-dihydroxy-15α-(2'-tetrahydropyranyloxy)-16(R)-methyl-13 trans-prostenoic acid (yield 97 percent) as a colorless oil, having the following physical characteristics:

Infra-red spectrum (liquid film): 3350, 2950–2850,–2250, 1710, 1460, 1440, 1380, 1245, 1200, 1180, 1120, 1080, 1025, 980, cm$^{-1}$ Nuclear magnetic resonance spectrum (in CDCl$_3$): δ 5.6–5.4 (m), 5.4–5.0 (broad s), 4.9–4.5 (m), 4.3–3.2 (m), 1.03–0.68 (m)

Thin-layer chromatography (chloroform:tetrahydrofuran:acetic acid=10:2:1):

Rf=0.43

REFERENCE EXAMPLE 19

9α,11α-dihydroxy-15α-(2'-tetrahydropyranyloxy)-16(S)-methyl-13 trans-prostenoic acid 9.5 g of 9α,11α-dihydroxy-15α-(2'-tetrahydropyranyloxy)-16(S)-methyl-5 cis,13 trans-prostadienoic acid was dissolved in 90 ml of methanol, and was added to the solution which has been prepared by suspending 1.19 g of 5 percent-palladium-carbon in 200 ml of methanol and by replacing with hydrogen. The catalytic reduction was taken place, at room temperature in an atmosphere of hydrogen at a pressure of 1 atm, until the absorption of a theoretical amount of hydrogen. The catalyst was filtered off, and the filtrate was concentrated in vacuo to yield 9.4 g of 9α,11α-dihydroxy-15α-(2'-tetrahydropyranyloxy)-16(S)-methyl-13 trans-prostenoic acid (yield 99 percent) as a colorless oil, having the following physical characteristics:

Infra-red spectrum (liquid film): 3350, 2950–2850,–2250, 1710, 1455, 1440, 1380, 1245, 1200, 1180, 1125, 1075, 1025 cm$^{-1}$ Nuclear magnetic resonance spectrum (in CDCl₃):
5.6–5.4 (m), 5.4–5.0 (br.s), 4.9–4.5 (m), 4.3–3.2 (m), 1.05–0.7 (m)

Thin-layer chromatography (chloroform:tetrahydrofuran:acetic acid=10:2:1):

Rf=0.44

9α,11α-dihydroxy-15α-(2'-tetrahydropyranyloxy)-17-methyl-13 trans-prostenoic acid 5.2 g of 9α,11α-dihydroxy-15α-(2'-tetrahydropyranyloxy)-17-methyl-5 cis,13 trans-prostadienoic acid was dissolved in 50 ml of methanol, and was added to the solution which has been prepared by suspending 650 mg of 5 percent-palladium-carbon in 150 ml of methanol and by replacing with hydrogen. The catalytic reduction was taken place, at room temperature in an atmosphere of hydrogen at a pressure of 1 atm, until the absorption of a theoretical amount of hydrogen. The catalyst was filtered off, and the filtrate was concentrated in vacuo to yield 5.15 g of 9α,11α-dihydroxy-15α-(2'-tetrahydropyranyloxy)-17-methyl-13 trans-prostenoic acid (yield 99 percent) as a colorless oil, having the following physical characteristics:

Infra-red spectrum (liquid film): 3350, 2950–2850, –2300, 1710, 1460, 1440, 1380, 1250, 1200, 1180, 1125, 1075, 1020, 980 cm⁻¹

Nuclear magnetic resonance spectrum (in CDCl₃):
5.6–5.35(m),5.2–4.85 (br.s),4.85–4.5(m), 4.3–3.2 (m), 1.03–0.7 (m)

Thin-layer chromatography (chloroform:tetrahydrofuran:acetic acid=10:2:1):

Rf=0.43

EXAMPLE 1-(A)

9α-hydroxy-11-oxo-15α-(2'-terahydropyranyloxy)-5 cis, 13 trans-prostadienoic acid 7.1 g of 9α,11α-dihydroxy-15α-(2'-tetrahydropyranyloxy)-5 cis,13 trans-prostadienoic acid was dissolved in 350 ml of acetone. After cooling to −25°C, 7.5 ml of Jones reagent (26.7 g of chromium trioxide and 23 ml of sulfuric acid was dissolved in water to make total volume of 100 ml) was added dropwise, and was stirred for 10 minutes at the same temperature. To this solution, 3 ml of isopropyl alcohol was added, and then diluted with 2 l of ether, washed with water and saturated sodium chloride solution, dried over anhydrous magnesium sulfate, and concentrated in vacuo to yield 6.1 of crude product. The crude product was purified by column chomatography on silica gel using the mixture of ethyl acetate and cyclohexane (3:2) to yield 5.1 g of the mixture of 15-tetrahydropyranyl ether of PGD₂ and 15-tetrahydropyranyl ether of PGE₂ (yield 72 percent).

Although the above two compounds can be separated by this column chromatography, the separation between PGD₂ and PGE₂ after the hydrolysis is easier than the above. Therefore, the next reaction was taken place with this mixture.

For the purpose of the confirmation of the structure, the said mixture was separated by the said column chromatography under strict conditions to obtain pure 9α-hydroxy-11-oxo-15α-(2'-tetrahydropyranyloxy)-5 cis, 13 trans-prostadienoic acid as a pale yellow oil, having the following physical characteristics:

Infra-red spectrum (liquid film): 3650–3300, 3250–2300, 1740, 1705, 1455, 1450, 1400, 1390, 1240, 1200, 1190, 1160, 1135, 1105, 1080, 1020, 980 cm⁻¹

Nuclear magnetic resonance spectrum (in CDCl₃): δ 6.7–6.0 (s), 5.6–5.1 (m), 4.78 (s), 4.2–3.3 (m), 2.6 (d), 2.18 (d), 1.8–1.5 (m), 1.45–1.05 (m), 0.87 (t)

Thin-layer chromatography (chloroform:tetrahydrofuran:acetic acid=10::2:1):

Rf=0.65

EXAMPLE 1-(B)

9α15α-dihydroxy-11-oxo-5 cis, 13 trans-prostadienoic acid 2.2 g of the mixture, which has been prepared according to the methods described in the Example 1-(A), was dissolved in 50 ml of the mixture of acetic acid, water and tetrahydrofuran (65:35:10). After stirring for one hour at 40°C, the solution was placed into 150 ml of ice water, extracted with ethyl acetate, washed with water and saturated sodium chloride solution, dried over anhydrous magnesium, and concentrated in vacuo to yield 2 g of crude product. The crude product was purified by column chromatography on silica gel using the mixture of ethyl acetate and cyclohexane (2:1) as an eluant to yield 935 mg of pure PGD₂ (yield 52.6 percent) as white crystals with the melting point 68°–70°C, having the following physical characteristics:

Infra-red spectrum (KBr tablet): 3430, 3320, 3000, 2950, 2920, 2850,–2400, 1725, 1700, 1450, 1425, 1405, 1360, 1340, 1320, 1285, 1260, 1200, 1160, 1080, 1035, 1000, 970, 945, 900, 750 cm⁻¹

Nuclear magnetic resonance spectrum (in CDCl₃): δ 5.7–5.35 (m), 5.35–4.80 (m), 4.48 (d), 4.25–3.95 (m), 2.93–2.7 (d—d), 2.5 - 2.37 (m), 2.37–2.20 (m), 2.15 (d), 1.85–1.43 (m), 1.43–1.10 (m), 0.88 (t)

Thin layer chromatography (benzene:dioxane:acetic acid=80:20:2):

Rf=0.26

Furthermore, when ethyl acetate was used an an eluant in the column chromatography, 368 mg of PGE₂ was obtained (yield 21 percent) as white crystals with the melting point 65°–67°C. The behaviors of this PGE₂ on the infra-red spectrum, nuclear magnetic resonance spectrum, thin-layer chromatography, and the biological activities were completely agreed with those of natural PGE₂.

Thin-layer chromatography (benzene:dioxane:acetic acid=80:20:2):

Rf=0.13

EXAMPLE 2-(A)

9α-hydroxy-11-oxo-15α-(2'-tetrahydropyranyloxy)-13 trans-prostenoic acid (PGD₂)

2.0 g of 9α, 11α-dihydroxy-15α-(2'-tetrahydropyranyloxy)-13 trans-prostenoic acid was treated with Jones reagent in the manner described in Example 1-(A), and was purified by the column chromatography on silica gel to yield 1.35 g of the mixture of 15-tetrahydropyranyl ether of PGD₁ and 15-tetrahydropyranyl ether of PGE₁ (yield 67 percent).

For the purpose of structural confirmation, a part of the mixture was again purified by the column chromatography to yield pure 9α-hydroxy-11-oxo-15α-(2'-tetrahydropyranyloxy)-13 trans-prostenoic acid as a pale yellow oil, having the following physical characteristics:

Infra-red spectrum (liquid film): 3650–3300, 3250–2300, 1740, 1705, 1455, 1450, 1400, 1385, 1240, 1200, 1190, 1160, 1135, 1105, 1080, 1020, 980 cm$^{-1}$ Nuclear magnetic resonance spectrum (in CDCl$_3$): δ 6.7–6.0 (s), 5.58–5.14 (m), 4.78 (s), 4.2–3.3 (m), 2.6 (d), 2.18 (d), 1.8–1.46 (m), 1.45–1.03 (m), 0.86 (t)

Thin-layer chromatography (chloroform:tetrahydrofuran:acetic acid=10:2:1):

Rf=0.68

EXAMPLE 2-(B)

9α,15α-dihydroxy-11-oxo-13 trans-prostenoic acid (PGD$_1$)

1.358 g of the mixture which has been prepared according to the methods described in Example 2-(A) was treated with the same manner as Example 1-(B) to yield 468 mg of PGD$_1$ (yield 43 percent) and 207 mg of PGE$_1$ (yield 19 percent).

The physical characteristics of PGD$_1$ are as follows:

Infra-red spectrum (KBr tablet): 3600–3200, 3000–2500, 1730, 1700, 1460, 1400, 1360, 1320, 1280, 1255, 1220, 1180, 1160, 1115, 1110, 1080, 1020, 980, 975 cm$^{-1}$ Nuclear magnetic resonance spectrum (in CDCl$_3$): δ 5.70–5.45 (m), 5.30–4.80(br.s)4.47 (d), 4.17–3.90 (m), 2.93–2.70 (d—d), 2.50–2.37 (m), 2.37–2.23 (m), 2.15 (d), 1.80–1.43 (m), 1.43–1.10 (m), 0.88 (t)

Thin-layer chromatography (benzene:dioxane:acetic acid=80:20:2):

Rf=0.27

The behaviors of PGE$_1$ on the infra-red spectrum, nuclear magnetic resonance spectrum, thin-layer chromatography, and the biological activities were completely agreed with those of natural PGE$_1$.

Thin-layer chromatography (benzene:dioxane:acetic acid=80:20:2):

Rf=0.13

EXAMPLE 3

9α,15-dihydroxy-11-oxo-15-methyl-5 cis, 13 trans-prostadienoic acid (15-methyl-PGD$_2$)

5.0 g of 9α,11α-dihydroxy-15-(2'-tetrahydropyranyloxy)-15-methyl-5 cis,13 trans-prostadienoic acid was dissolved in 230 ml of aceton. After cooling to −25°C, 5.3 ml of Jones reagent (See Example 1-(A)) was added dropwise, and was stirred for 10 minutes at about −20°−−30°C. To this solution, 2 ml of isopropyl alcohol was added, and then diluted with 1.5 l of ether, washed with water, dried over anhydrous magnesium sulfate, and concentrated in vacuo. The residue was purified by column chromatography on silica gel using the mixture of cyclohexane and ethyl acetate (2:3) to yield 3.2 g of the mixture of 15-tetrahydropyranyl ether of 15-methyl-PGD$_2$ and 15-tetrahydropyranyl ether of 15-methyl-PGE$_2$ (yield 64 percent).

Next, 3.2 g of the above mixture was dissolved in 75 ml of the mixture of acetic acid, water and tetrahydrofuran (65:35:10), and was stirred for one hour at 40°C. Then, the solution was placed into 300 ml of ice water, extracted with ethyl acetate, washed with water, dried over anhydrous magnesium sulfate, and concentrated in vacuo. The crude product was purified by column chromatography on silica gel using the mixture of ethyl acetate and cyclohexane (2:1) as an eluant to yield 1.22 g of pure 15-methyl-PGD$_2$ (yield 47 percent), having the following physical characteristics:

Infra-red spectrum (liquid film): 3420, 2960–2850,−2400, 1735, 1705, 1450, 1405, 1375, 1240, 1180, 1160, 1040, 975 cm$^{-1}$ Nuclear magnetic resonance spectrum (in CDCl$_3$): δ 5.75–4.34 (m), 5.16–4.70 (broad s), 4.56–4.38 (m), 4.25–3.92 (m), 2.73 (d—d), 1.00–0.70 (t)

Thin-layer chromatography (benzene:dioxane:acetic acid=80:20:2):

Rf=0.26

Furthermore, when ethyl acetate was used as an eluant in the column chromatography, 468 mg of 15-methyl-PGE$_2$ was obtained (yield 18 percent).

Thin-layer chromatography (benzene:dioxane:acetic acid=80:20:2):

Rf=0.14

EXAMPLE 4

9α,15α-dihydroxy-11-oxo-16(R)-methyl-5 cis, 13 trans-prostadienoic acid (16(R)-methyl-PGD$_2$)

6.65 g of 9α,11α-dihydroxy-15α-(2'-tetrahydropyranyloxy)-16(R)-methyl-5 cis,13 trans-prostadienoic acid was dissolved in 300 ml of acetone, and then oxidized by 7.0 ml of Jones reagent (See Example 1-(A)) for 15 minutes at −20°−−30°C. The solution was post-treated and purified according to the methods described in Example 3 to yield 4.72 g of the mixture of 15-tetrahydropyranyl ether of 16(R)-methyl PGD$_2$ and 15-tetrahydropyranyl ether of 16(R)-methyl PGE$_2$ (yield 71 percent).

Next, 4.72 g of the above mixture was hydrolyzed in 100 ml of the mixture of acetic acid, water and tetrahydrofuran (65:35:10) for 1 hour at 40°C, and then post-treated and purified according to the methods described in Example 3 to yield 1.50 g of 16-(R)-methyl -PGD$_2$ and 720 mg of 16(R)-methyl-PGE$_2$ (total yield 58 percent).

Infra-red spectrum of 16(R)-methyl-PGD$_2$ (liquid film): 3400, 2960 − 2850, − 2300, 1740, 1710, 1460, 1405, 1380, 1245, 1175, 1160, 1040, 980 cm$^{-1}$ Nuclear magnetic resonance spectrum of 16(R)-methyl-PGD$_2$ (in CDCl$_3$): δ 5.68–5.35 (m), 5.05–4.55 (broad s), 4.55–4.39 (m), 4.25–3.90 (m), 2.74 (d—d), 1.03–0.72 (m)

Thin-layer chromatography (benzene:dioxane:acetic acid=80:20:2):
16(R)-methyl-PGD$_2$   Rf=0.28
16(R)-methyl-PGE$_2$   Rf=0.13

EXAMPLE 5

9α,15α-dihydroxy-11-oxo-16(S)-methyl-5 cis, 13 trans-prostadienoic acid (16(S)-methyl-PGD$_2$)

9.15 g of 9α,11α-dihydroxy-15α-(2'-tetrahydropyranyloxy)-16(S)-methyl-5 cis, 13 trans-prostadienoic acid was dissolved in 300 ml of ether. After cooling to 0°C, 300 ml of chromic acid solution (CrO$_3$ 2.75 g, MnSO$_4$.H$_2$O 14.5 g and H$_2$SO$_4$ 3.1 ml were dissolved in 65 ml of water) was added, and was stirred for 40 minutes at about 0°–5°C. Then, 3 ml of isopropyl alcohol was added. The water layer was separated, extracted with ethyl acetate, added to the previous ether layer, well-washed with water, dried over anhydrous magnesium sulfate and concentrated in vacuo. The residue was purified by column chromatography on silica gel using the mixture of cyclohexane and ethyl acetate (2:3) as an eluant to yield 4.85 g of the mixture of 15-tetrahydropyranyl ether of 16(S)-methyl-$PGD_2$ and 15-tetrahydropyranyl ether of 16(S)-methyl-$PGE_2$ (total yield 53 percent).

Next, 4.85 g of the above mixture was hydrolyzed in 100 ml of the mixture of acetic acid, water and tetrahydrofuran (65:35:10) for 1 hour at 40°C, and then post-treated and purified according to the methods described in Example 3 to yield 1.75 g of 16(S)-methyl-$PGD_2$ and 780 mg of 16(S)-methyl-$PGE_2$ (total yield 64 percent).

Infra-red spectrum of 16(S)-methyl-$PGD_2$ (liquid film): 3400, 2960–2850,–2300, 1735, 1710, 1460, 1405, 1380, 1245, 1175, 1160, 1035, 980 $cm^{-1}$ Nuclear magnetic resonance spectrum of 16(S)-methyl-$PGD_2$ (in $CDCl_3$): δ 5.68–5.50 (m), 5.50–5.10 (broad s), 4.55–4.39 (m), 4.25–3.90 (m), 2.74 (d—d), 1.03 –0.72 (m)

Thin-layer chromatography (benzene:dioxane:acetic acid=80:20:2):
16(S)-methyl-$PGD_2$  Rf=0.27
16(S)-methyl-$PGE_2$  Rf=0.13

EXAMPLE 6

9α,15α-dihydroxy-11-oxo-17-methyl-5 cis, 13 trans-prostadienoic acid (17-methyl-$PGD_2$)

5.5 g of 9α,11α-dihydroxy-15α-(2'-tetrahydropyranyloxy)-17-methyl-5 cis, 13 trans-prostadienoic acid was dissolved in 250 ml of acetone, and then oxidized by 6.0 ml of Jones reagent (See Example 1-(A)) for 15 minutes at –20°- –30°C. The solution was post-treated and purified according to the methods described in Example 3 to yield 3.47 g of the mixture of 15-tetrahydropyranyl ether of 17-methyl-$PGD_2$ and 15-tetrahydropyranyl ether of 17-methyl-$PGE_2$ (yield 63 percent).

Next, 3.47 g of the above mixture was hydrolyzed in 80 ml of the mixture of acetic acid, water and tetrahydrofuran (65:35:10) for 1 hour at 40°C, and then post-treated and purified according to the methods described in Example 3 to yield 1.356 g of 17-methyl-$PGD_2$ and 520 mg of 17-methyl-$PGE_2$ (total yield 58 percent).

Infra-red spectrum of 17-methyl-$PGD_2$ (liquid film): 3400, 2960–2850,–2300, 1735, 1710, 1460, 1405, 1380, 1240, 1180, 1160, 1040, 980 $cm^{-1}$ Nuclear magnetic resonance spectrum of 17-methyl-$PGD_2$ (in $CDCl_3$): δ 5.70–5.32 (m), 5.32–4.90 (broad s), 4.58–4.35 (m), 4.25–3.88 (m), 2.74 (d—d), 1.03–0.68 (m)

Thin-layer chromatography (benzene:dioxane:acetic acid=80:20:2):
17-methyl-$PGD_2$  Rf=0.29
17-methyl-$PGE_2$  Rf=0.15

EXAMPLE 7

9α,15-dihydroxy-11-oxo-15-methyl-13 trans-prostenoic acid (15-methyl-$PGD_1$)

7.5 g of 9α,11α-dihydroxy-15-(2'-tetrahydropyranyloxy)-15-methyl-13 trans-prostenoic acid was dissolved in 350 ml of acetone, and then oxidized by 8.0 ml of Jones reagent (See Example 1-(A)) for 15 minutes at –20°- –30°C. The solution was post-treated and purified according to the methods described in Example 3 to yield 5.02 g of the mixture of 15-tetrahydropyranyl ether of 15-methyl-$PGD_1$ and 15-tetrahydropyranyl ether of 15-methyl-$PGE_1$ (yield 67 percent).

Next, 5.0 g of the above mixture was hydrolyzed in 110 ml of the mixture of acetic acid, water and tetrahydrofuran (65:35:10) for 1 hour at 40°C, and then post-treated and purified according to the methods described in Example 3 to yield 1.70 g of 15-methyl-$PGD_1$ and 780 mg of 15-methyl-$PGE_1$ (total yield 61 percent).

Infra-red spectrum of 15-methyl-$PGD_1$ (liquid film): 34oo, 2960–2850,–2300, 1740, 1710, 1460, 1410, 1380, 1245, 1180, 1160, 1045, 985 $cm^{-1}$ Nuclear magnetic resonance spectrum of 15-methyl-$PGD_1$ (in $CDCl_3$): δ 5.75–5.50 (m), 5.45–5.00 (broad s), 4.63–4.38 (m), 4.25–3.86 (m), 2.75 (d—d) 1.03–0.75 (t)

Thin-layer chromatography (benzene:dioxane:acetic acid=80:20:2):
15-methyl-$PGD_1$  Rf=0.27
15-methyl-$PGE_1$  Rf=0.13

EXAMPLE 8

9α,15α-dihydroxy-11-oxo-16(R)-methyl-13 trans-prostenoic acid (16(R)-methyl-$PGD_1$)

6.80 g of 9α,11α-dihydroxy-15α-(2'-tetrahydropyranyloxy)-16(R)-methyl-13 trans-prostenoic acid was dissolved in 300 ml of acetone, and then oxidized by 7.2 ml of Jones reagent (See Example 1-(A)) for 15 minutes at –20°-30°C. The solution was post-treated and purified according to the methods described in Example 3 to yield 4.0 g of the mixture of 15-tetrahydropyranyl ether of 16(R)-methyl-$PGD_1$ and 15-tetrahydropyranyl ether of 16(R)-methyl-$PGE_1$ (yield 59 percent).

Next, 4.0 g of the above mixture was hydrolyzed in 90 ml of the mixture of acetic acid, water and tetrahydrofuran (65:35:10) for 1 hour at 40°C, and then post-treated and purified according to the methods described in Example 3 to yield 1.306 g of 16(R)-methyl-$PGD_1$ and 450 mg of 16(R)-methyl-$PGE_1$ (total yield 54 percent).

Infra-red spectrum of 16(R)-methyl-$PGD_1$ (liquid film): 3400, 2960–2850,–2300, 1735, 1705, 1455, 1375, 1240, 1180, 1160, 1040, 980 $cm^{-1}$ Nuclear magnetic resonance spectrum of 16(R)-methyl-$PGD_1$ (in $CDCl_3$): δ 5.72–5.52 (m), 5.52–5.10 (broad s), 4.62–4.42 (m), 4.24–3.96 (m), 2.74 (d—d), 1.00–0.70 (m)

Thin-layer chromatography (benzene:dioxane:acetic acid=80:20:2):
16(R)-methyl-$PGD_1$  Rf=0.29
16(R)-methyl-$PGE_1$  Rf=0.14

EXAMPLE 9

9α,15α-dihydroxy-11-oxo-16(S)-methyl-13 trans-prostenoic acid (16(S)-methyl-PGD₁)

8.5 g of 9α,11α-dihydroxy-15α-(2'-tetrahydropyranyloxy)-16(S)-methyl-13 trans-prostenoic acid was dissolved in 280 ml of ether, and then oxidized by 280 ml of chromic acid (See Example 5) for 45 minutes at about 0°–5°C. The solution was post-treated and purified according to the methods described in Example 5 to yield 4.08 g of the mixture of 15-tetrahydropyranyl ether of 16(S)-methyl-PGD₁ and 15-tetrahydropyranyl ether of 16(S)-methyl-PGE₁ (yield 48 percent).

Next, 4.0 g of the above mixture was hydrolyzed in 900 ml of the mixture of acetic acid, water and tetrahydrofuran (65:35:10) for 1 hour at 40°C, and then post-treated and purified according to the methods described in Example 3 yield 1.45 g of 16(S)-methyl-PGD₁ and 630 mg of 16(S)-methyl-PGE₁ (total yield 64 percent).

Infra-red spectrum of 16(S)-methyl-PGD₁ (liquid film): 3400, 2960–2850,–2300, 1735, 1705, 1455, 1380, 1240, 1180, 1160, 1040, 980 cm⁻¹

Nuclear magnetic resonance spectrum of 16(S)-methyl-PGD₁ (in CDCl₃): δ 5.72–5.50 (m), 5.25–4.80 (broad s), 4.63–4.42 (m), 4.24–3.94 (m), 2.74 (d—d), 1.00–0.72 (m)

Thin-layer chromatography (benzene:diozane:acetic acid=80:20:2):
16(S)-methyl-PGD₁   Rf=0.29
16(S)-methyl-PGE₁   Rf=0.14

EXAMPLE 10

9α,15α-dihydroxy-11-oxo-17-methyl-13 trans-prostenoic acid (17-methyl-PGD₁)

5.0 g of 9α,11α-dihydroxy-15α-(2'-tetrahydropyranyloxy)-17-methyl-13 trans-prostenoic acid was dissolved in 220 ml of acetone, and then oxidized by 5.4 ml of Jones reagent (See Example 1–(A)) for 15 minutes at −20°-−30°C. The solution was post-treated and purified according to the methods described in Example 3 to yield 3.25 g of the mixture of 15-tetrahydropyranyl ether of 17-methyl-PGD₁ and 15-tetrahydropyranyl ether of 17-methyl-PGE₁ (yield 65 percent).

Next, 3.2 g of the above mixture was hydrolyzed in 75 ml of the mixture of acetic acid, water and tetrahydrofuran (65:35:10) for 1 hour at 40°C, and then post-treated and purified according to the methods described in Example 3 to yield 1.128 g of 17-methyl-PGD₁ and 433 mg of 17-methyl-PGE₁ (total yield 60 percent).

Infra-red spectrum of 17-methyl-PGD₁ (liquid film): 3430, 2960–2850,–2350, 1740, 1710, 1460, 1405, 1380, 1245, 1180, 1160, 1045, 980 cm⁻¹

Nuclear magnetic resonance spectrum of 17-methyl-PGD₁ (in CDCl₃): δ 5.74–5.53 (m), 5.30–4.85 (broad s), 4.60–4.36 (m), 4.25–3.85 (m), 2.75 (d—d), 1.03–0.70 (m)

Thin-layer chromatography (benzene:dioxane:acetic acid=80:20:2):
17-methyl-PGD₁   RF=0.28
17-methyl-PGE₁   Rf=0.13

We claim:

1. A process for producing a compound of the formula:

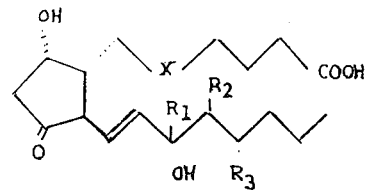

wherein X is —CH₂CH₂— or cis—CH=CH—, and R₁, R₂ and R₃ are each hydrogen or one or two of R₁, R₂ and R₃ are methyl and the remainder are hydrogen, which comprises oxidizing with a member selected from the group consisting of chromic acid and Jones reagent at a temperature of about 10° to −50° C, the hydroxy radical in the 11-position of a compound of the formula:

wherein X R₁, R₂ and R₃ are as hereinbefore defined, and THP represents a 2-tetrahydropyranyl group, and hydrolyzing in a aqueous acid a temperature of less than 45°C the resulting compound of the formula:

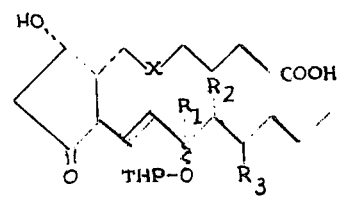

and separating, the desired compound from the reaction mixture.

2. Process according to claim 1 wherein the symbols R₁, R₂ and R₃ each represent a hydrogen atom.

3. Process according to claim 1 in which the hydrolysis is carried out with aqueous acetic acid or dilute hydrochloric acid.

4. Process according to claim 1 in which the hydrolysis is carried out with the 15-tetrahydropyranyloxy prostaglandin D compound in a water-miscible organic solvent.

* * * * *

UNITED STATES PATENT OFFICE
CERTIFICATE OF CORRECTION

PATENT NO. : 3,878,239
DATED : April 15, 1975
INVENTOR(S) : Masaki Hayashi, et al.

It is certified that error appears in the above-identified patent and that said Letters Patent are hereby corrected as shown below:

Please cancel the structure in the Abstract as well as the structure in Claim 1 on Column 22 between Lines 11-20, and substitute therefor

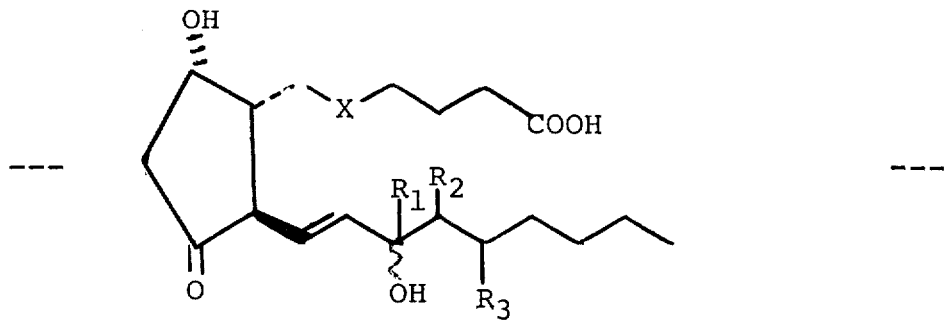

UNITED STATES PATENT OFFICE
CERTIFICATE OF CORRECTION

PATENT NO. : 3,878,239  Page 2
DATED : April 15, 1975
INVENTOR(S) : Masaki Hayashi, et al.

It is certified that error appears in the above-identified patent and that said Letters Patent are hereby corrected as shown below:

On Column 16, Line 56, please cancel: ($PGD_2$).

On Column 22, Line 30, after "the formula:" please insert

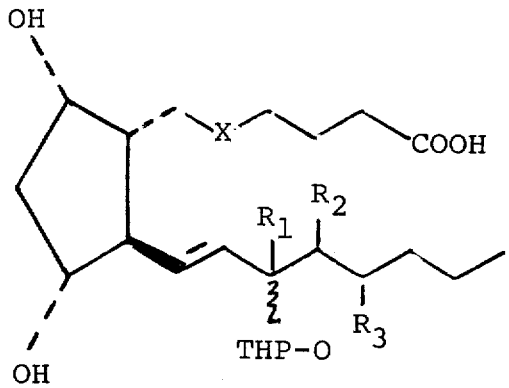

Signed and Sealed this eighteenth Day of November 1975

[SEAL]

Attest:

RUTH C. MASON
Attesting Officer

C. MARSHALL DANN
Commissioner of Patents and Trademarks